March 5, 1974   T. E. BOLLER   3,795,535
METHOD OF TREATING A SURFACE OF A GLASS ARTICLE
AND THE GLASS ARTICLE PRODUCED THEREFROM
Filed May 29, 1969
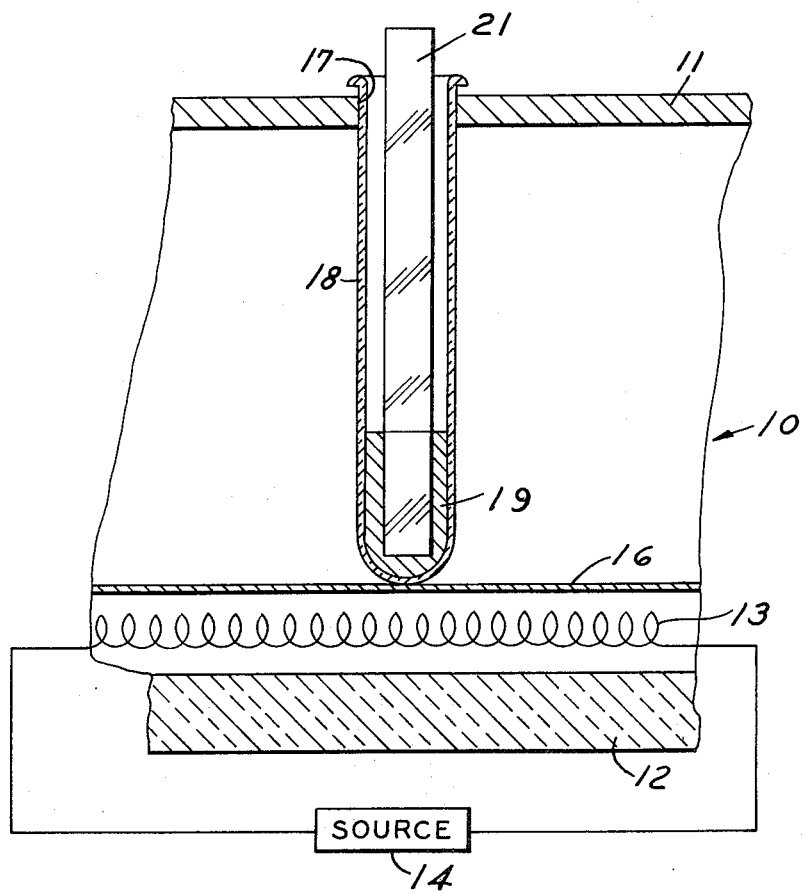
INVENTOR
THOMAS E BOLLER
BY John R Faulkner
William E Johnson
ATTORNEYS

United States Patent Office 3,795,535
Patented Mar. 5, 1974

3,795,535
METHOD OF TREATING A SURFACE OF A GLASS ARTICLE AND THE GLASS ARTICLE PRODUCED THEREFROM
Thomas E. Boller, Detroit, Mich., assignor to Ford Motor Company, Dearborn, Mich.
Filed May 29, 1969, Ser. No. 828,907
Int. Cl. C03b 21/00
U.S. Cl. 117—118                 16 Claims

ABSTRACT OF THE DISCLOSURE

A surface of a glass article is treated to make the glass surface water wettable (hydrophilic) in the following manner. A bath of a mixture of an ion exchange medium for the glass and a material which has surface active qualities is formed. The glass article is treated in the bath and an interchange of ions from the ion exchange medium is effected between the glass. This ion interchange results in a carryover to the glass of at least a portion of the material having the surface active qualities. The materials having the surface active qualities are preferably selected from the group consisting essentially of silicones, silanes and fluorocarbons.

BACKGROUND OF THE INVENTION

The deposition of water or fog spots on windshields and backlights of automotive vehicles proves hazardous at times until such spots may be removed. The spotting of automotive glass is caused by the fact that glass and water are hydrophobic with respect to one another under normal conditions. Therefore, when either a fine spray of water or a foggy mist settles on the glass enclosing a vehicle, the water tends to form small droplets on the glass which reduce the viewability through the glass.

It is desirable under such glass fogging conditions to have glass which is hydrophilic with respect to water. In such a case, the water would not bead up on the glass but would flow along the surface thereof to be discharged at some selected position. Making the glass hydrophilic would also both aid in acting as a lubricant for glass wipers and ease the removal of bug spots and dirt from the glass.

SUMMARY OF THE INVENTION

This invention relates to a method of treating a surface of a glass article and the glass article produced therefrom. In greater detail, this invention relates to a method of rendering a surface of a glass article wettable by water and to the glass article produced thereby.

In its broader aspects, the method of treating the surface of a glass article has the following steps. A bath is formed of a mixture of a material which is an ion exchange medium for the type of glass article being treated and a material which has surface active qualities. The glass article to be treated is immersed in the mixture and an interchange of ions from the ion exchange medium is effected between the glass which results in a carryover to the surface of the glass article of at least a portion of the material having the surface active quality.

In greater detail, the method of rendering the surface of the glass article wettable by water utilizes a material which has surface active qualities, the material being selected from the group consisting essentially of silicones, silanes and fluorocarbons. The interchange of ions and surface active material from the bath to the glass is effected by heating at least the interfacial area between the mixture forming the bath and the glass surface being treated.

In still greater detail, the preferred mixture for forming the bath contains potassium nitrate as the ion exchange material when a soda-lime glass article is to be treated. The material having the surface active qualities is preferably selected from the group consisting essentially of methylphenylpolysiloxane and methyl (1% beta-naphthol) polysiloxane.

DESCRIPTION OF THE DRAWING

The drawing shows schematically an apparatus in which the method of this invention can be performed.

DESCRIPTION OF THE PREFERRED EMBODIMENT

Construction

Glass samples have been prepared that could not be fogged with water. These samples were prepared in accordance with the following method.

With reference to the figure, a container, generally identified by the numeral 10, is shown which is completely enclosed and insulated with upper and lower walls respectively designated 11 and 12. The interior of the container 10 is heated by an electrical coil 13 which is operated by suitable electric supply source 14.

Within the container 10, there is mounted by means not shown a supporting shelf 16. The upper insulated wall 11 has an opening 17 therein which receives a receptacle 18 therewithin, the bottom of the receptacle resting upon the supporting shelf 16. In such a manner, the substantial portion of the receptacle 18 is subjected to the heated ambient surrounding the same which is confined within the container 10.

The bottom of the receptacle 18 contains a treating mixture 19 which is described in greater detail subsequently in this specification. Also, inserted within the receptacle 18 is a glass article or sheet designated by the numeral 21, the glass sheet having the lower portion thereof immersed in the mixture 19 contained within the receptacle 18.

Operation

In accordance with the principles and teachings of the method of this invention, the mixture 19 contained within the receptacle 18 is formed from both a material which is an ion exchange medium for the type of glass being treated and a material which has surface active qualities. In greater detail, the mixture 19 employs materials having surface active qualities, which materials are selected from the group consisting essentially of silicones, silanes and fluorocarbons. In still greater detail, the surface active materials found most suitable for use in conjunction with a soda-lime glass is a silicone material selected from the group consisting essentially of methylphenylpolysiloxane and methyl (1% beta-naphthol) polysiloxane.

In accordance with a preferred embodiment of the method of this invention, a mixture 19 is formed of potassium nitrate ($KNO_3$) forming 99.5 to 99.9 percent by weight of the mixture with 0.1 to 0.5 weight percent of the silicone material methylphenylpolysiloxane filling out the remainder of the mixture. Initially, the potassium nitrate is deposited in the receptable 18 and heated to a temperature slightly above its melting point of 650° F. by utilization of heat generated by the electric coil 13 contained within the chamber 10. The silicone material is then added as a liquid to the liquid potassium nitrate and is dispersed into the $KNO_3$ with a stirring rod. The entire mixture 19 is then heated to a temperature of 900° F. by continued operation of the electric coil 13. The bath 19 is then allowed to stand for a period of several hours.

Glass samples 21 to be treated are prepared by detergent washing, drying, salt dipping, removal into ambient air, and then washing. In greater detail, each glass sample 21 is thoroughly washed utilizing a detergent and allowed to dry. The glass sample is then immersed in the mixture 19 for a period of from one to two minutes. The glass samples utilized were soda-lime glass so the potassium from the $KNO_3$ exchanged with the sodium ions of the glass to partially chemically strengthen the glass. During this strengthening process, some carryover of the surface active material, in this case the methylphenylpolysiloxane, was achieved to the glass surface. The carryover of the surface active material has special advantages which will be pointed out below.

The exact mechanism for the carryover of the surface active material is not understood although various glass surfaces so treated have been studied by spectroscopy, interferometry, optical microscopy, X-ray diffraction, microprobe, and electron microscope techniques. Through all these tests, no positive results have been achieved as to the exact manner and extent to which the surface active materials are either carried over to, attached to, or remain on the glass surface. However, there is some definite type of carryover to the glass surface of the surface active materials because samples treated merely in a salt bath without the surface active materials do not have the characteristics found in samples treated in a bath having a small amount of surface active material contained therein.

The difference between the treatment of the glass surface with and without surface active materials added to an ion exchange material are as follows. Glass samples treated with the ion exchange material containing the surface active material possess anti-fogging characteristics. More particularly, the glass surface, when exposed to water vapor, does not permit the condensation of the water vapor on the glass in droplet form to produce a fogging appearance. The water condenses on the glass but it condenses in a uniform and smooth flowable sheet which does not hinder vision therethrough. Also since the water condenses in a uniform manner, the water flows easily off the sheet. Another advantage of the treated surface is that dirt and bug spots which become attached to the glass under normal driving conditions are easily wiped off and removed. Also, another advantage of such treated glass is found with its use in conjunction with the newly introduced electrically heated backlights. These backlights are more rapidly defogged and deiced when treated glass is utilized in their construction. It also has been found that tempered glass may be treated by the method of this invention.

What is claimed is:

1. A method rendering the surface of a glass article wettable by water which comprises:

forming a mixture of a material which is an ion exchange medium for the type of glass article being treated and a material which has surface active qualities selected from the group consisting essentially of silicones, silanes and fluorocarbons;

immersing the surface of the glass to be treated in said mixture; and heating at least the interfacial area between said mixture and said glass surface to effect an interchange of ions from said ion exchange medium and said glass which results in a carryover to the surface of the glass article of said material having said surface active qualities.

2. The method of claim 1 wherein a major proportion of said mixture is said ion exchange material and a very minor proportion of said mixture has said surface active qualities.

3. A method of rendering the surface of a glass article wettable by water which comprises:

forming a mixture of a material which is an ion exchange medium for the type of glass article being treated and a silicone material which has surface active qualities selected from the group consisting essentially of methylphenylpolysiloxane and methyl (1% beta-naphthol) polysiloxane;

immersing the surface of the glass to be treated in said mixture; and heating at least the interfacial area between said mixture and said glass surface to effect an interchange of ions from said ion exchange medium and the surface of the glass article which results in a carryover to the glass of said material having said surface active qualities.

4. The method of claim 3 wherein said material having said surface active qualities forms 0.1 to 0.5 weight percent of the total mixture.

5. The method of claim 4 wherein the glass is a soda-lime glass.

6. The method of claim 5 wherein said ion exchange medium is $KNO_3$.

7. The method of claim 6 wherein said heating of the interfacial area is accomplished by heating said mixture to a temperature in the area of 900° F.

8. The method of claim 7 wherein said glass surface is immersed in said mixture for a period of 1 to 2 minutes.

9. The method of claim 8 wherein said mixture is heated to the temperature in the range of 900° F. and maintained at that temperature for several hours to age the same prior to the placing of a glass surface therein.

10. As a new article of manufacture, the treated glass article as produced by the method of claim 3.

11. As a new article of manufacture, the treated glass article as produced by the method of claim 4.

12. As a new article of manufacture, the treated glass article as produced by the method of claim 5.

13. As a new article of manufacture, the treated glass article as produced by the method of claim 6.

14. As a new article of manufacture, the treated glass article as produced by the method of claim 7.

15. As a new article of manufacture, the treated glass article as produced by the method of claim 8.

16. As a new article of manufacture, the treated glass article as produced by the method of claim 9.

References Cited
UNITED STATES PATENTS

| | | | |
|---|---|---|---|
| 1,585,555 | 5/1926 | Mansurzadah | 65—30 |
| 2,881,566 | 4/1959 | Badger | 65—30 |
| 3,481,726 | 12/1969 | Fischer et al. | 65—30 |

ARTHUR D. KELLOGG, Primary Examiner

U.S. Cl. X.R.

65—30, 116; 117—124 B, 124 D